United States Patent
Roberts et al.

(10) Patent No.: US 9,720,558 B2
(45) Date of Patent: *Aug. 1, 2017

(54) SYSTEMS AND METHODS FOR PROVIDING A PERSONALIZED MEDIA SERVICE USER INTERFACE

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 453 days.

This patent is subject to a terminal disclaimer.

(21) Appl. No.: 14/042,711

(22) Filed: Sep. 30, 2013

(65) Prior Publication Data

US 2014/0156792 A1    Jun. 5, 2014

Related U.S. Application Data

(60) Provisional application No. 61/732,247, filed on Nov. 30, 2012.

(51) Int. Cl.
G06F 15/16 (2006.01)
G06F 3/0481 (2013.01)
H04L 29/08 (2006.01)
G06F 3/0482 (2013.01)
H04N 21/4722 (2011.01)
(Continued)

(52) U.S. Cl.
CPC .......... G06F 3/0481 (2013.01); G06F 3/0482 (2013.01); G06Q 30/02 (2013.01);
(Continued)

(58) Field of Classification Search
CPC ............... H04N 5/781; H04N 21/2665; H04N 21/4722; H04N 21/23424; H04N 21/2225;
(Continued)

(56) References Cited

U.S. PATENT DOCUMENTS 7,394,967 B1 * 7/2008 Potrebic ................. H04N 5/781
386/248
8,122,477 B1 * 2/2012 Stepanian .............. G06Q 30/06
705/307

(Continued)

*Primary Examiner* — Dustin Nguyen

(57) ABSTRACT

An exemplary method includes a media service provider system tracking statuses of media programs with respect to a user of a media service through which the media programs are distributed by way of a plurality of different media distribution models and providing a user interface view personalized for the user for display on a display screen, the user interface view including personalized user interface content that indicates one or more of the statuses of one or more of the media programs with respect to the user. In certain examples, the statuses indicated in the user interface view may include at least a first status of a first media program distributed by way of a first media distribution model and a second status of a second media program included in the media programs and distributed by way of a second media distribution model. Corresponding systems and methods are also described.

20 Claims, 12 Drawing Sheets

(51) Int. Cl.
*H04N 21/472* (2011.01)
*H04N 21/218* (2011.01)
*H04N 21/482* (2011.01)
*H04N 21/27* (2011.01)
*G06Q 30/02* (2012.01)
*G06Q 30/06* (2012.01)
*H04N 21/2543* (2011.01)
*H04N 21/488* (2011.01)

(52) U.S. Cl.
CPC ..... *G06Q 30/0607* (2013.01); *G06Q 30/0609* (2013.01); *H04L 67/10* (2013.01); *H04N 21/218* (2013.01); *H04N 21/2543* (2013.01); *H04N 21/27* (2013.01); *H04N 21/472* (2013.01); *H04N 21/4722* (2013.01); *H04N 21/47202* (2013.01); *H04N 21/47214* (2013.01); *H04N 21/482* (2013.01); *H04N 21/4882* (2013.01)

(58) Field of Classification Search
CPC .......... H04N 21/472; H04N 21/47214; H04N 21/4882; G06F 17/30029; G06Q 30/0225; G06Q 30/0255; G06Q 10/087; G07F 11/005
USPC ..... 709/203, 218; 715/719, 747; 725/32, 34, 725/44, 46; 386/248; 707/784; 705/16, 705/26.1, 307; 700/232
See application file for complete search history.

(56) References Cited

U.S. PATENT DOCUMENTS

| | | | |
|---|---|---|---|
| 8,584,165 B1* | 11/2013 | Kane | H04N 21/2225 707/784 |
| 2003/0040962 A1* | 2/2003 | Lewis | G06Q 30/0225 725/32 |
| 2004/0172275 A1* | 9/2004 | Gross | G06Q 30/06 705/26.1 |
| 2004/0186783 A1* | 9/2004 | Knight | G06Q 10/087 705/16 |
| 2006/0010467 A1* | 1/2006 | Segel | H04N 21/23424 725/34 |
| 2007/0130585 A1* | 6/2007 | Perret | H04N 7/17318 725/46 |
| 2010/0031162 A1* | 2/2010 | Wiser | G06Q 30/0255 715/747 |
| 2013/0110978 A1* | 5/2013 | Gordon | H04N 21/2665 709/218 |
| 2013/0184856 A1* | 7/2013 | Gregerson | G07F 11/005 700/232 |
| 2013/0262558 A1* | 10/2013 | Wood | H04N 21/4722 709/203 |
| 2014/0075316 A1* | 3/2014 | Li | G06F 17/30029 715/719 |
| 2014/0245353 A1* | 8/2014 | Raza | H04N 21/4821 725/44 |

* cited by examiner

| Find a location | ▼ | | | | Search Movies, etc. 🔍 |
|---|---|---|---|---|---|
| | MOVIES | TV SHOWS | GAMES | My Redbox | ▼ 🛒 Cart ❷ |

My Redbox Back to Dashboard ─526

Bookmarks

Sort View by: [Title Name ▶] ─702

| TITLE | | RATINGS | REMOVE |
|---|---|---|---|
| Cover Art | The Complete Metropolis<br>On Demand \| Last Watched 12/14/12 at 8:17 PM<br>PG | [MORE INFO] ★★★★☆ | ⊗ ─706 |
| Cover Art | Cloverfield<br>Date Added 2/10/13 ─704<br>PG-13 | [MORE INFO] ★★★★☆ | ⊗ |
| Cover Art | Monsters<br>Coming Soon 10/5/13<br>PG-13 | [MORE INFO] ★★★★★ | ⊗ |
| Cover Art | X-Men: First Class<br>Date Added 12/28/12<br>PG-13 | [MORE INFO] ★★★★★ | ⊗ |
| Cover Art | Thor<br>Date Added 12/10/12<br>PG-13 | [MORE INFO] ★★★★☆ | ⊗ |

Fig. 7

| Find a location \| ▼ | | | | Search Movies, etc. 🔍 |
|---|---|---|---|---|
| MOVIES | TV SHOWS | GAMES | | My Redbox \| ▼  🛒 Cart ❷ |

My Redbox Back to Dashboard ——526

Purchases  Sort View by: [Title Name ▶]

| | TITLE | | RATINGS |
|---|---|---|---|
| Cover Art | Harry Potter and the Half-Blood Prince<br>Date Purchased 2/10/13 at 5:15 PM<br>HD | WATCH NOW<br>⤷806 | ★★★★☆ |
| Cover Art | District 9<br>▬▬▭▭ 27 of 162 mins ⤷804<br>Date Purchased 2/10/13 at 5:15 PM<br>HD | FINISH WATCHING<br>⤷808 | ★★★☆☆ |
| Cover Art | Tron Legacy ▬▬▬▬▭ 92 of 112 mins<br>Date Purchased 3/16/13 at 7:11 PM<br>HD | FINISH WATCHING | ★★★★☆ |
| Cover Art | Skyfall<br>Date Purchased 12/28/12 at 2:36 PM<br>HD | WATCH AGAIN<br>⤷810 | ★★★★★ |
| Cover Art | The Numbers Station<br>Date Purchased 12/10/12 at 3:05 PM<br>HD | WATCH AGAIN | ★★★☆☆ |

Fig. 8

SYSTEMS AND METHODS FOR PROVIDING A PERSONALIZED MEDIA SERVICE USER INTERFACE

RELATED APPLICATIONS

The present application claims priority under 35 U.S.C. §119(e) to U.S. Provisional Patent Application No. 61/732,247, filed Nov. 30, 2012. The contents of the provisional patent application are hereby incorporated by reference in their entirety.

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video service typically provides a user of the service with tools for discovering video programs offered for access through the video service. While a conventional video service provides useful tools for discovery of the video programs offered by the service, there remains room for new and/or improved tools that may further benefit users and/or a provider of the service. For example, there remains room to improve user interface tools to better assist a user of the service in intuitively, conveniently, and/or comprehensively discovering information about video programs and/or the ways that the video programs are accessible by the user through the video service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-10 illustrate exemplary media service user interface views personalized for a user of a media service according to principles described herein.

DETAILED DESCRIPTION OF PREFERRED EMBODIMENTS

Exemplary systems and methods for providing a personalized media service user interface are described herein. The systems and methods described herein may facilitate convenient, intuitive, personalized, and/or otherwise helpful user discovery of, interaction with, and/or management of media programs distributed by way of a media service.

For example, in an exemplary method, a media service provider system may track statuses of media programs with respect to a user of a media service through which the media programs are distributed by way of a plurality of different media distribution models and provide a user interface view personalized for the user for display on a display screen, the user interface view including personalized user interface content that indicates one or more of the statuses of one or more of the media programs with respect to the user. In certain examples, the statuses may include at least a first status of a first media program included in the media programs and distributed by way of a first media distribution model and a second status of a second media program included in the media programs and distributed by way of a second media distribution model. The personalized user interface view may include additional and/or alternative user interface content personalized for the user. Examples of personalized media service user interface views, personalized user interface content, statuses of media programs, and media distribution models and are described herein.

The systems and methods described herein may benefit end users and/or a provider of a media service through which media programs are distributed by multiple different media distribution models. For example, one or more of the features described herein may enhance user experiences with discovery of, interaction with, and/or management of media programs accessible through the media service. These and additional or alternative benefits and/or advantages that may be provided by one or more of the exemplary systems and methods described herein will be made apparent herein.

Exemplary systems and methods for providing a personalized media service user interface will now be described in reference to the accompanying drawings.

Figure 1:
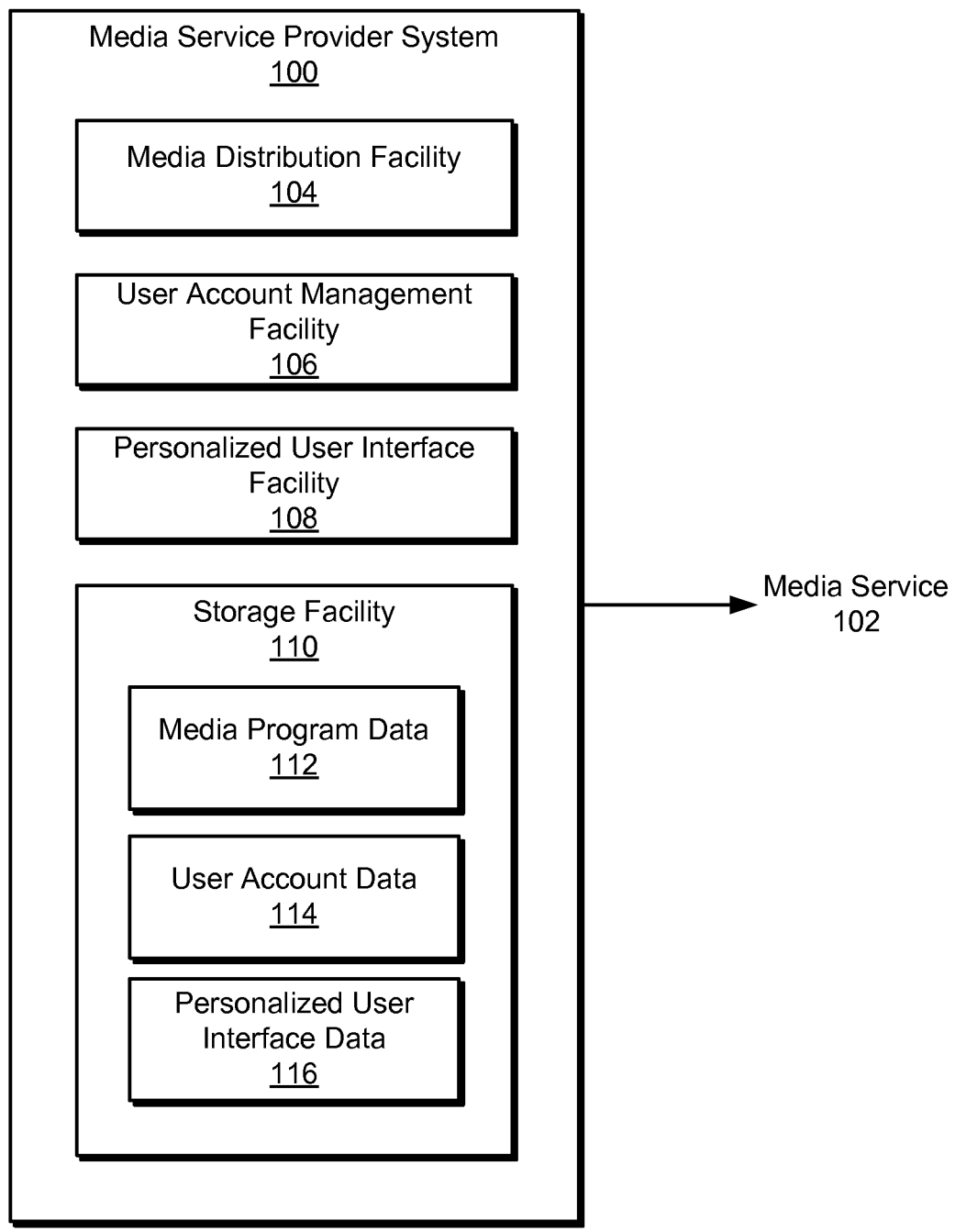
FIG. 1 illustrates an exemplary media service provider system according to principles described herein.

FIG. 1 illustrates an exemplary media service provider system 100 ("system 100"). System 100 may be configured to facilitate discovery, access, and/or consumption of media programs by one or more users. For example, system 100 may be configured to provide a media service 102 to one or more end users of the media service 102 (e.g., one or more subscribers to the media service 102). System 100 may be associated with (e.g., operated by) a provider of the media service 102 ("service provider"). Through the media service 102, an end user of the media service may discover, access, and/or consume media programs distributed by system 100.

In certain examples, the media service 102 may be an integrated media service 102 at least because the media service 102 distributes media programs by way of multiple different media distribution models, thus providing an end user of the media service 102 with access to media programs by way of multiple different media distribution models. Examples of media distribution models associated with the media service 102 are described herein.

As used herein, the term "media program" may refer to any discrete instance of media content that may be distributed by the media service 102 for consumption by an end user of the media service 102. For example, a media program may refer to any television program, on-demand media program, pay-per-view media program, broadcast media program (e.g., broadcast television program), multicast media program (e.g., multicast television program), narrowcast media program (e.g., narrowcast video-on-demand program), Internet Protocol television ("IPTV") media program, advertisement, video, movie, audio program, radio program, or any other media program that a user may access by way of the media service 102. Such media programs that are made available for user consumption by way of the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a user account management facility 106 ("user account facility 106"), a personalized user interface facility 108, and a storage facility 110 selectively and communicatively coupled to one another. The facilities may be communicatively coupled one to another by any suitable communication technologies.

It will be recognized that although facilities 104-110 are shown to be separate facilities in FIG. 1, any of those facilities may be combined into a single facility or split into additional facilities as may serve a particular implementation. Additionally or alternatively, one or more of the facilities 104-110 may be omitted from and external to system 100 in other implementations. Facilities 104-110 will now be described in more detail.

Storage facility 110 may be configured to store media program data 112 representative of media programs that may be distributed by distribution facility 104, user account data 114 representative of one or more accounts of one or more users with media service 102, and personalized user interface data 116 generated and/or used by personalized user interface facility 108 to provide one or more personalized user interfaces for use by end users of the media service 102 to discover, access, consume, and/or manage the media programs, such as described herein. Storage facility 110 may maintain additional or alternative data as may serve a particular implementation.

Distribution facility 104 may be configured to distribute media programs to users of the media service 102. Distribution facility 104 may be configured to distribute media programs in any way and/or form that is suitable to facilitate consumption of the media programs by users of the media service 102.

In certain examples, distribution facility 104 may be configured to distribute media programs by way of multiple different media programs distribution channels. For example, distribution facility 104 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs, and/or other physical computer-readable copies of media programs are distributed to users of the media service 102.

Figure 2:
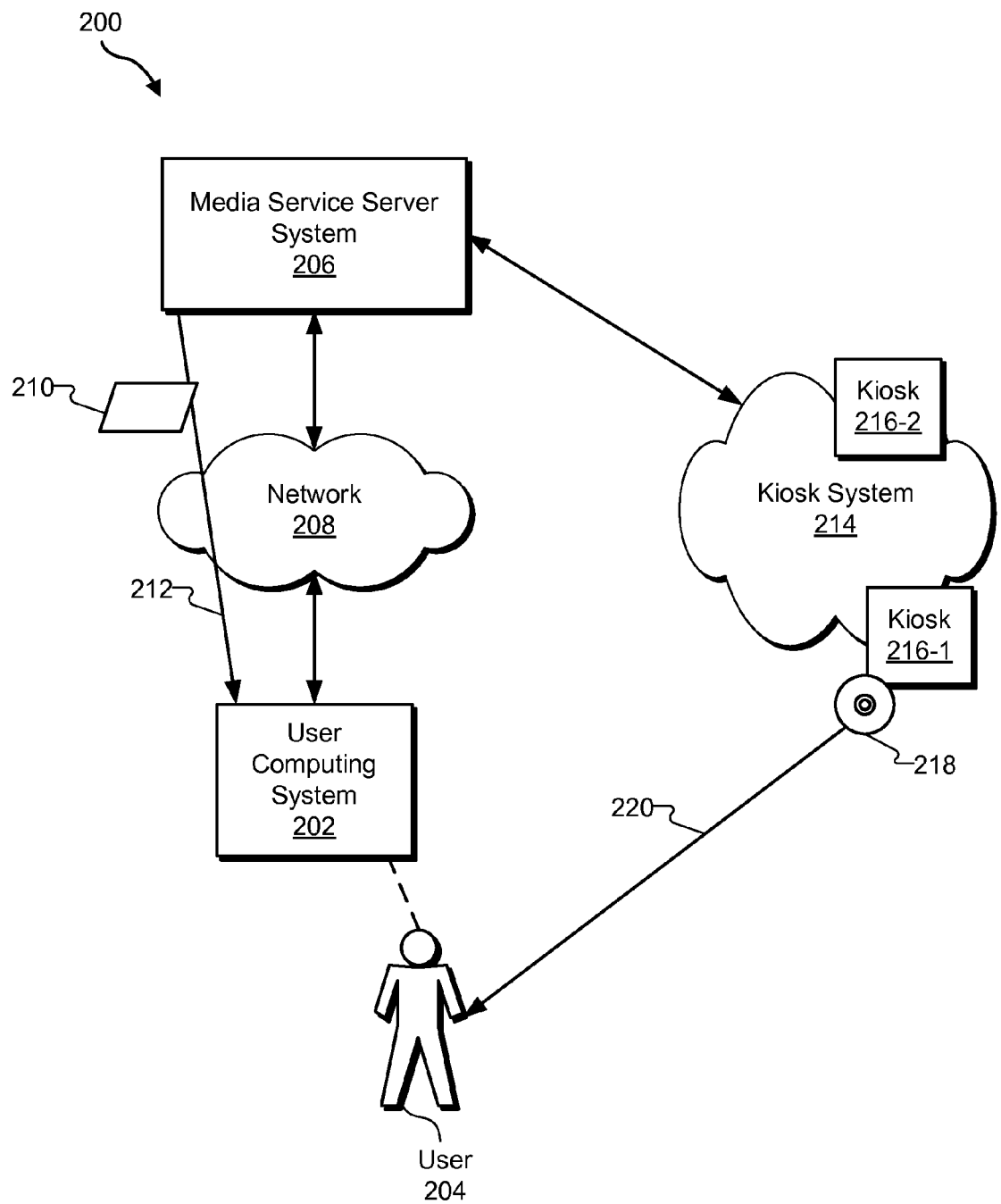
FIG. 2 illustrates an exemplary media programs distribution configuration according to principles described herein.

FIG. 2 illustrates an exemplary media programs distribution configuration 200. Components of system 100 may be implemented by one or more of the elements of the configuration 200 shown in FIG. 2. As shown, the configuration 200 may include a user computing system 202 associated with a user 204, who may be an end user of the media service 102. User computing system 202 may be in communication with a media service server system 206 ("server system 206"), which may include one or more computing devices (e.g., server devices) remotely located from user computing system 202 and/or operated by a provider of the media service 102.

User computing system 202 and server system 206 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and server system 206. Communications between user computing system 202 and server system 206 may be transported using any one of the above-listed networks, or any combination or sub-combination of the above-listed networks. Alternatively, user computing system 202 and server system 206 may communicate in another way such as by direct connections between user computing system 202 and server system 206.

The configuration 200 may support distribution of media programs, through the media service 102, by way of multiple different media distribution channels, such as a digital media distribution channel and a physical media distribution channel. As shown, server system 206 may distribute media programs such as digital data 210 representative of a media program to user computing system 202 by way of a digital media distribution channel 212. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, server system 206 may be in communication with a media vending kiosk system 214, which may include one or more geographically distributed vending kiosks 216 (e.g., vending kiosks 216-1 and 216-2) configured to vend physical copies of media programs, such as a physical copy 218 of a media program, to user 204 by way of a physical media distribution channel 220. For example, user 204 may visit a location of media vending kiosk 216-1 and obtain the physical copy 218 of the media program from the media vending kiosk 216-1. In certain examples, one or more of the vending kiosks 216 may include automated media vending machines.

The user computing system 202 may be configured for use by the user 204 to access the media service 102 provided by system 100. For example, the user 204 may utilize the user computing system 202 to access one or more user interfaces provided by system 100 as part of the media service 102, and to present the user interfaces for use by the user 204 to discover, access, consume and/or manage media programs distributed by way of the digital media distribution channel 212 and/or the physical media distribution channel 220 as part of the media service 102.

The user computing system 202 may include one or more user computing devices associated with the user 204. Examples of such devices include, without limitation, a media player computing device (e.g., a media disc player device such as a DVD or BLU-RAY disc player device), a display device, a set-top box device, a digital video recording ("DVR") device, a computer, a tablet computer, a smart phone device, and any other device capable of accessing the media service 102 and/or media programs provided by system 100 by way of the media service 102.

In certain examples, the user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service 102) may be displayed. Such an example is illustrative only. Other examples of user computing system 202 may include any combination of user computing devices or a single user computing device configured to perform any of the user computing system and/or device operations described herein.

Returning to FIG. 1, in certain examples, distribution facility 104 may be configured to provide users of the media service 102 with access to media programs by way of a plurality of different media distribution models ("distribution models"). Each distribution model may define a particular way that an end user of the media service 102 may gain access to media programs through the media service 102 and/or that media programs are distributed to end users of the service. Thus, a user of the media service 102 may be able to gain access to media programs by way of multiple different distribution models.

In certain examples, the distribution models may include multiple distribution-channel-based models such as a digital media distribution model that corresponds to a digital media distribution channel and a physical media distribution model that corresponds to a physical media distribution channel. For example, a digital media distribution model may include or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another service-provider-defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-base distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
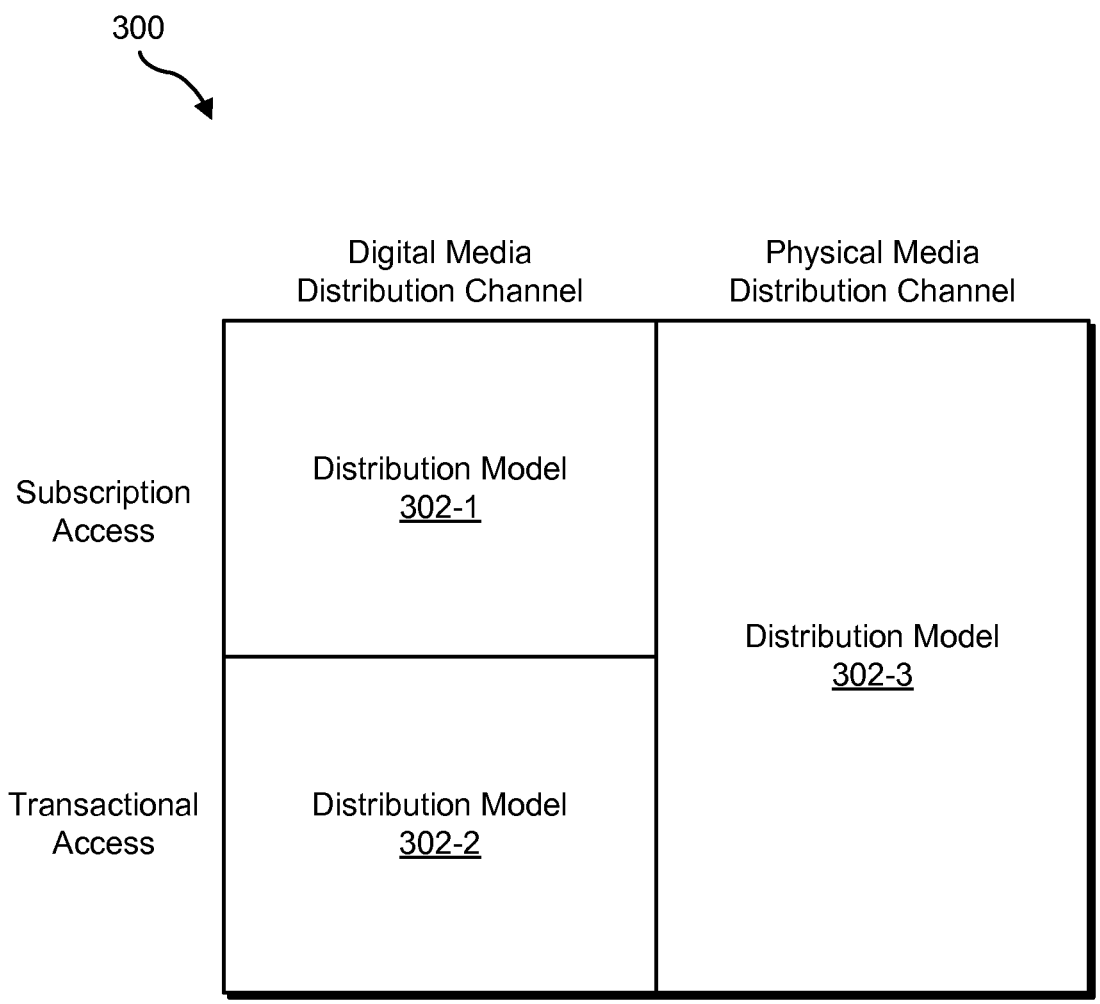
FIG. 3 illustrates a table representing an exemplary set of different media distribution models by way of which access to media programs may be provided by way of a media service according to principles described herein.

Distribution facility 104 may be configured to provide users of the media service 102 with access to media programs by way of any of the different distribution models described herein, or by way of any combination or subcombination thereof. As an example, FIG. 3 illustrates a table 300 representing a set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based and transactional-based access to media programs by way of a physical media distribution channel. In certain examples, these distribution models 302 may be referred to as a "subscription" digital distribution model 302-1, an "on-demand" or "rent/buy" digital distribution model 302-2, and a "physical" or "kiosk" distribution model 302-3.

Media programs distributed by distribution facility 104 as part of the media service 102 may be assigned by distribution facility 104 and/or a service provider to one or more of the distribution models supported by distribution facility 104. For example, certain media programs may be made available by way of all of the distribution models of the media service 102 and certain media programs may be made available by way of only a subset of the distribution models (e.g., by way of only a subscription digital channel-based distribution model, only a transactional digital channel-based distribution model, only a physical channel-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

Returning to FIG. 1, user account facility 106 may be configured to manage user accounts for users of the media service 102. The management of user accounts may include user account facility 106 creating user accounts for new users of the media service 102, adding, modifying, and/or deleting data included in the user accounts, and archiving and/or deleting inactive and/or terminated user accounts.

A user account may include data representative of any information that may be helpful in providing features of the media service 102 to a user. For example, a user account may include data representative of access credentials (e.g., login information) for the user, device information about one or more devices used by the user to access the media service 102, user information about the user (e.g., user preferences), and information about user privileges (e.g., access rights such as to which media programs and/or distribution models the user has access). The user account may also include data representative of statuses of media programs with respect to the user. Examples of such statuses are described in detail herein.

Figure 4:
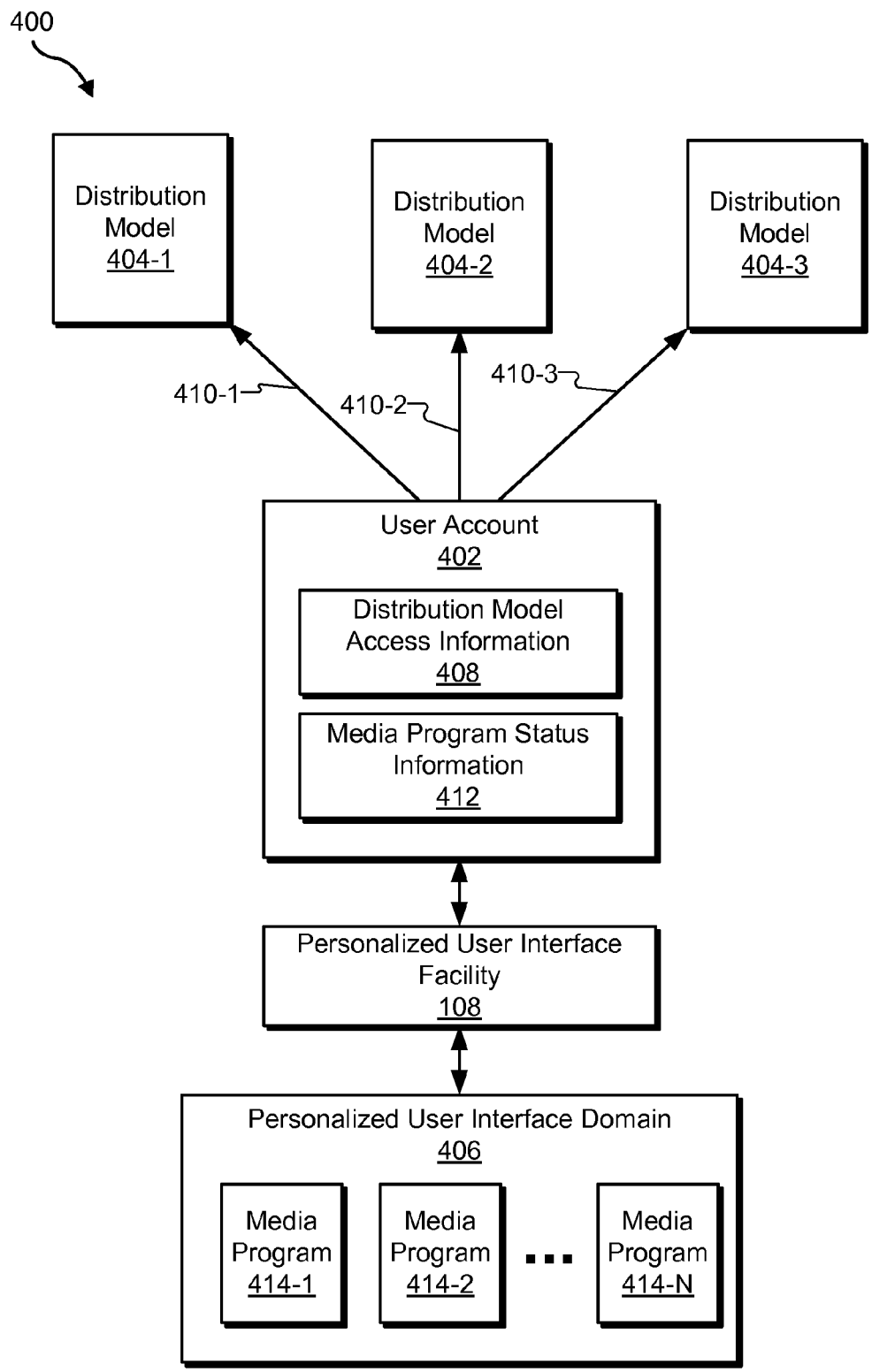
FIG. 4 illustrates an exemplary configuration that includes a user account for a user of a media service according to principles described herein.

FIG. 4 illustrates an exemplary configuration 400 of a user account 402 in relation to a set of distribution models 404 (e.g., distribution models 404-1 through 404-3), personalized user interface facility 108, and a personalized user interface domain 406. As shown, user account 402 may include distribution model access information 408, which may indicate the access privileges of the user (e.g., user 204) represented by the user account 402 to the distribution models 404 (e.g., to media programs distributed by the distribution models 404). For example, the distribution model access information 408 may indicate that the user has access to all three of the distribution models 404, as represented by arrows 410 (e.g., arrows 410-1 through 410-3) in FIG. 4.

As further shown, user account 402 may include media program status information 412, which may indicate statuses of media programs with respect to the user represented by the user account 402. A status of a media program with respect to a user, as indicated by user account 402, may represent any relationship between the media program and the user. In certain examples, the status of the media program with respect to the user may represent a status of a user interaction with the media program. For example, the status of the media program with respect to the user may indicate that the user has bookmarked, accessed (e.g., purchased, rented, downloaded, picked up a physical copy, etc.), consumed (e.g., partially or completely played back, rated, etc.), and/or otherwise interacted with the media program. The media program status information 412 may indicate such user interaction statuses and any information associated with the user interactions, such as times when the user interactions occurred.

In certain examples, a status that indicates that the user has bookmarked a media program may be referred to as a "bookmark status," a status that indicates that the user has accessed a media program may be referred to as an "access status," and a status that indicates that the user has consumed a media program may be referred to as a "consumption progress status." These status types may be sub-categorized. For example, an access status may include a "purchase status" indicating that the user has purchased a media program, a "rented status" indicating that the user has rented a media program, a "download status" indicating that the user has downloaded a digital copy of a media program, a "disc picked up" or "disc out" status indicating that the user has picked up but not yet returned a physical copy of a media program, a "disc returned" status indicating that the user has returned a physical copy of a media program, and any other access status that indicates a particular user interaction to access a media program. As another example, a consumption progress status may include a "partially consumed status" indicating that the user has started but not yet finished playback of a media program and a "completely consumed status" indicating that the user has started and completed playback of a media program.

A status of a media program with respect to a user may indicate any information related to that status. For example, data representative of such a status may indicate times associated with the status, such as a scheduled rental expiration time, a playback time, a time of a most recent user interaction with the media program, etc.

The status of a media program with respect to a user may be utilized by personalized user interface facility 108 as a basis for moving a media program into and/or out of the personalized user interface domain 406. For example, personalized user interface facility 108 may be configured to access media program status information 412 and, based on the statuses of media programs represented therein, determine a set of media programs to be included in the personalized user interface domain 406. In the example illustrated in FIG. 4, data representative of media programs 414 (e.g., media programs 414-1 through 414-N) is included in the personalized user interface domain 406 based on the media program status information 412. Exemplary conditions for moving media programs in and out of the personalized user interface domain 406 are described herein. As also described herein, the personalized user interface domain 406 may be used by personalized user interface facility 108 to generate a personalized user interface.

Returning, to FIG. 1, personalized user interface facility 108 may be configured to track and use the statuses of media programs with respect to a user to generate a user interface personalized for the user. Personalized user interface facility 108 may be configured to track the statuses of media programs with respect to a user in any suitable way. As an example, the tracking may include personalized user interface facility 108 accessing media program status information 412 in user account 402 to determine statuses of media programs with respect to the user represented by the user account 402. Such accessing may be performed at any suitable time, such as periodically in accordance with a predefined access schedule or dynamically in response to an occurrence of a predefined access trigger event (e.g., in response to a user request for a personalized user interface or a particular view of the personalized user interface).

As another example, the tracking may include personalized user interface facility 108 monitoring for one or more predefined user interactions with media programs, including interactions such as purchases, rentals, bookmarks, downloads, disc pick-ups, disc returns, consumptions, and/or other direct user interactions with media programs. In such an example, personalized user interface facility 108 may detect any such user interactions in any suitable way, such as based on user input received by a media service user interface and/or media service operations performed by system 100. In certain examples, personalized user interface facility 108 may provide data representative of monitored user interactions to user account facility 106 for use by user account facility 106 to update the media program status information 412 maintained in user account 402.

These examples of personalized user interface facility 108 tracking statuses of media programs with respect to a user are illustrative only. Additional or alternative ways of determining statuses of media programs with respect to a user may be used by personalized user interface facility 108 in other examples.

In certain examples, personalized user interface facility 108 may be further configured to track other statuses for media programs that have been identified as having a status with respect to a user. For example, personalized user interface facility 108 may be configured to track availability statuses of the media programs with respect to each of the distribution models supported by distribution facility 104. An availability status may indicate whether a media program is available or unavailable for access by the user by way of a distribution model. The availability status may further indicate a time period for the availability status, such as a period of time and/or an expiration of a period of time during which a media program is available for access by the user by way of a distribution model. As described herein, an availability status of a media program to a user may be used by personalized user interface facility 108 to provide a personalized user interface.

Personalized user interface facility 108 may be configured to provide a personalized user interface, which may include generating the personalized user interface based on the statuses of media programs with respect to a user. In certain examples, this may include personalized user interface facility 108 defining a personalized user interface domain, such as personalized user interface domain 406, for the user. For example, personalized user interface facility 108 may define a set of media programs represented in the personalized user interface domain, such as by moving data representative of media programs into and out of the personalized user interface domain based on the statuses of the media programs with respect to the user.

Personalized user interface facility 108 may be configured to move media programs into and out of the personalized user interface domain based on a set of predefined conditions associated with the statuses of media programs with respect to a user. In certain examples, the predefined conditions may specify that a media program is to be moved into the personalized user interface domain in response to the media program being bookmarked, accessed (e.g., purchased, rented such as by being reserved for rental or picked up from a vending kiosk, downloaded, streamed, etc.), consumed (e.g., entirely or partially played back, rated, etc.), and/or otherwise interacted with by the user.

A user may perform and system 100 may detect such user interactions with the media program in any suitable way. With respect to bookmarking a media program, for example, system 100 may provide one or more user interface tools for use by the user to add a media program to a bookmark list of media programs, which may be indicative of the media program being of interest to the user. In certain examples, the set of predefined conditions for moving media programs into the personalized user interface domain may be restricted to direct user interactions with the media program, such as any such user interactions listed above.

In certain examples, the predefined conditions may specify that a media program is to be moved out of the personalized user interface domain in response to the media program being un-bookmarked (e.g., a user provides input to remove a bookmark from the media program) or otherwise expressly removed from the personalized user interface domain by the user. The predefined conditions may also specify that a media program is to be moved out of the personalized user interface domain in response to the media program becoming unavailable by way of any of the distribution models to which the user has access.

Personalized user interface facility 108 may be configured to use the content of the personalized user interface domain to generate a personalized user interface, which may include generating one or more views of the personalized user interface that personalized user interface facility 108 may provide for display on a display screen (e.g., a display screen of a user device included in or otherwise associated with computing system 202). Personalized user interface facility 108 may select content to include in a personalized user interface view based on the content of the personalized user interface domain, statuses of media programs with respect to a user, availability statuses of media programs, other information about the media programs, and/or other suitable information. Exemplary personalized user interface views that may be provided by personalized user interface facility 108 for display will now be described in reference to FIGS. 5-10.

As will be illustrated, one or more of the exemplary personalized user interface views shown in FIGS. 5-10 may include personalized user interface content that indicates statuses, with respect to a user, of media programs distributed by multiple, different distribution models. For example, a personalized user interface view may include personalized user interface content that indicates a first status, with respect to the user, of a first media program distributed by way of a first media distribution model and a second status, with respect to the user, of a second media program distribution by way of a second media distribution model, where the second media distribution model is different from the first media distribution model. In some examples, the personalized user interface content may further indicate any other status (e.g., a third status), with respect to the user, of any other media program (e.g., a third media program) distributed by way of any other media distribution model (e.g., a third media distribution model) that is different from the first and second media distribution models.

The media distribution models by way of which the media programs having the statuses indicated by the personalized user interface content are distributed may include any of the exemplary media distribution models described herein. In certain examples, for instance, the first media distribution model may include a digital media distribution model that utilizes a digital media distribution channel, and the second media distribution model may include a physical media distribution model that utilizes a physical media distribution channel (e.g., a media vending kiosk-based distribution channel). In certain additional or alternative examples, the first media distribution model may include a subscription-based media distribution model, and the second media distribution model may include a transactional-based media distribution model. Statuses of media programs distributed by other combinations of distribution models may be indicated in a personalized user interface view in other examples.

Figure 5:
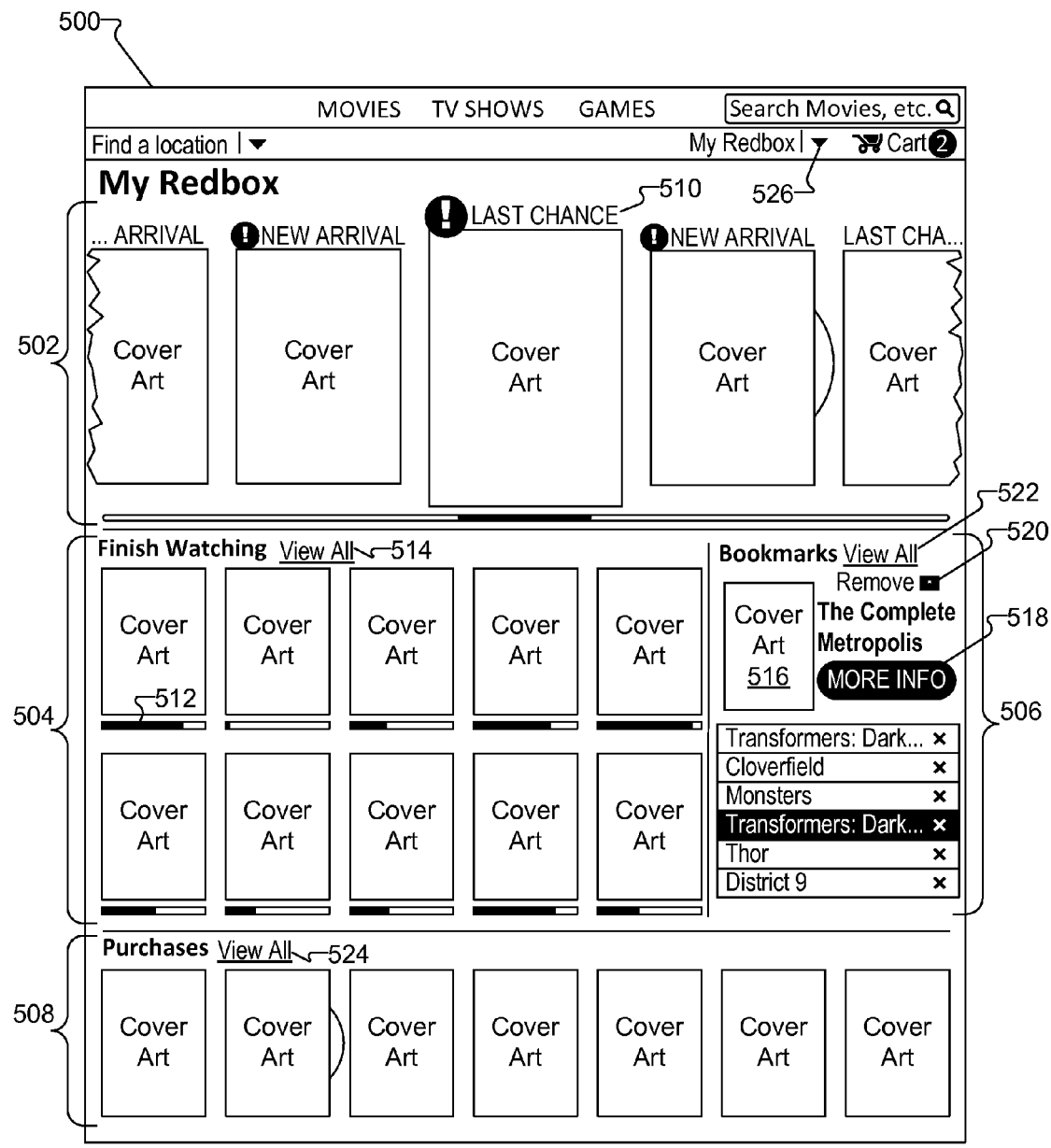

Turning now to the exemplary personalized user interface views shown in FIGS. 5-10, FIG. 5 illustrates an exemplary personalized user interface view 500 ("view 500") that may be provided by personalized user interface facility 108. In certain examples, view 500 may function as a launch page of a personalized user interface and/or may be a dashboard view that includes a compilation of various categories of personalized user interface content (e.g., personalized user interface content associated with different categories of media program statuses, such as a consumption progress status category, a bookmark status category, and/or any access status category). As shown in FIG. 5, view 500 may include a reminders section 502, a consumption progress section 504, a bookmarks section 506, and a purchases section 508. Each of these sections will now be described.

The reminders section 502 may include personalized user interface content representative of one or more media programs that have been identified as being associated with reminders to be presented to the user in the reminders section 502. In FIG. 5, for example, the reminders section 502 includes a scrollable grid of cover art images representing media programs identified as being associated with reminders to be presented to the user.

Personalized user interface facility 108 may be configured to identify media programs and associated reminders for inclusion in the reminders section 502 in any suitable way. For example, personalized user interface facility 108 may determine that a predefined reminder condition has been satisfied for a media program included in the personalized user interface domain. The condition may be defined in advance by a provider of the media service 102 to trigger a presentation, by the personalized user interface facility 108, of a reminder to the user. Examples of such reminders and associated reminder conditions will now be described.

In certain examples, personalized user interface facility 108 may be configured to provide a reminder, in the reminders section 502, to indicate to the user that a physical copy of a media program included in the personalized user interface domain is ready for pickup at a media vending kiosk. Within the reminders section 502, such a reminder may include a textual message indicating that the physical copy of the media program is ready for pickup. Personalized user interface facility 108 may include such a reminder in the reminders section 502 (along with a representation of the media program that is the subject of the reminder) in response to a corresponding reminder condition being satisfied. For example, personalized user interface facility 108 may include the reminder in the reminders section 502 when a reserved or bookmarked media program is available at a particular media vending kiosk indicated by the user as a preferred media vending kiosk or at a media vending kiosk that is located within a predefined geographic distance of a location of the user. Personalized user interface facility 108 may be configured to remove the "ready for pickup" reminder from the reminders section 502 when a physical copy of the media program is picked up by the user (e.g., from a media vending kiosk) or after a predetermined length of time that the reminder has been included in the reminders section 502.

In certain examples, personalized user interface facility 108 may be configured to provide a reminder, in the reminders section 502, to indicate to the user that a physical copy of a media program included in the personalized user interface domain is in the possession of the user (e.g., the physical copy of the media program has been pickup up from a media vending kiosk but not yet returned to a media vending kiosk). Within the reminders section 502, such a reminder may include a textual message indicating that the media program is in the possession of the user and/or is due for return. Personalized user interface facility 108 may include such a reminder in the reminders section 502 (along with a representation of the media program that is the subject of the reminder) in response to a corresponding reminder condition being satisfied. For example, personalized user interface facility 108 may include the reminder in the reminders section 502 when a physical copy of a media program has been picked up from a media vending kiosk by the user but not yet returned to a media vending kiosk. Personalized user interface facility 108 may be configured to remove this reminder from the reminders section 502 when the physical copy of the media program is returned to a media vending kiosk or after a predetermined length of time that the reminder has been included in the reminders section 502.

In certain examples, personalized user interface facility 108 may be configured to provide a reminder, in the reminders section 502, to indicate to the user an outstanding on-demand digital rental of a media program. Within the reminders section 502, such a reminder may include a textual message indicating that a digital rental of the media program is open and/or a scheduled expiration of the rental (e.g., text indicating an expiration date and time or a countdown to the expiration date and time). Personalized user interface facility 108 may include such a reminder in the reminders section 502 (along with a representation of the media program that is the subject of the reminder) in response to a corresponding reminder condition being satisfied. For example, personalized user interface facility 108 may include the reminder in the reminders section 502 when the media program has been rented on-demand and the rental period has not yet expired or when the countdown to the expiration of the rental is within a predefined length of time. Personalized user interface facility 108 may be configured to remove this reminder from the reminders section 502 when the rental expires.

In certain examples, personalized user interface facility 108 may be configured to provide reminders, in the reminders section 502, based on availability statuses of media programs included in the personalized user interface domain. Such reminders may indicate changes in availability of the media programs. As an example, a bookmarked media program may have recently become available by way of a particular distribution model or by way of any of the distribution models supported by distribution facility 104. In response to this predefined reminder condition being satisfied, personalized user interface facility 108 may provide a reminder, in the reminders section 502, to indicate to the user that the bookmarked media program has recently become available. Within the reminders section 502, such a reminder may include a textual message indicating that the media program is now available (e.g., a textual message such as "now available"). Personalized user interface facility 108 may be configured to keep the reminder in the reminders section 502 for a predetermined period of time (e.g., five days) before removing the reminder from the reminders section 502.

As another example, a bookmarked media program may be scheduled to become unavailable in the near future such that a loss of access to the media program by way of a particular distribution model or by way of any of the distribution models to which the user has access is imminent. In response to this predefined reminder condition being satisfied, personalized user interface facility 108 may provide a reminder, in the reminders section 502, to indicate to the user that a loss of access to the bookmarked media program is imminent. Within the reminders section 502, such a reminder may include a textual message indicating that a loss of availability of the media program is imminent (e.g., a textual message such as "last chance"). Personalized user interface facility 108 may be configured to add the reminder to and keep the reminder in the reminders section 502 for a predetermined period of time (e.g., five days) before the loss of availability of the media program is scheduled to occur. Personalized user interface facility 108 may remove the reminder from the reminders section 502 when the loss of availability of the media program occurs.

Personalized user interface facility 108 may be configured to remove a reminder from the reminders section 502 in response to any suitable predefined reminder removal trigger condition being satisfied. For example, personalized user interface facility 108 may remove a reminder for a media program from the reminders section 102 in response to the media program being un-bookmarked or becoming unavailable to the user through any or all of the distribution models that are accessible by the user.

The media programs that are the subject of the reminders presented in reminders section 502 may be associated with multiple, different distribution models. For example, a first reminder may be presented for a first media program distributed by way of a first distribution model, and a second reminder may be presented for a second media program distributed by way of a second distribution model, different from the first distribution model. The different distribution models may include a combination of any of the different distribution models described herein.

View 500 illustrates examples of reminders that may be included in the reminders section 502. For example, a reminder 510 (e.g., "last chance") indicates that a loss of availability of a media program to a user by way of one or more distribution models is imminent.

In certain examples, multiple reminders for a single media program may be triggered by satisfaction of appropriate predefined reminder conditions. When this occurs with timing that may lead to concurrent inclusion of multiple reminders for the media program in the reminders section 502, personalized user interface facility 108 may determine how to handle the multiple reminders.

In some situations, personalized user interface facility 108 may include only one of the triggered reminders in the reminders section 502, such as when the triggered reminders are all the same type of reminder. To illustrate, the media program may be scheduled to become unavailable in multiple distribution models, triggering multiple reminders that the media program is about to become unavailable. In this example, personalized user interface facility 108 may include only one of the triggered reminders in the reminders section 502. Personalized user interface facility 108 may likewise include only one of the triggered reminders in the reminders section 502 when the multiple reminders each indicate that the media program has recently become available by way of multiple different distribution models.

In other situations, personalized user interface facility 108 may include more than one of the triggered reminders for the same media program in the reminders section 502. To illustrate, a physical copy of the media program may be rented by the user (e.g., from a media vending kiosk), and a digital copy of the media program may be rented by the user (e.g., on-demand), each event triggering a different reminder for the media program. In this example, personalized user interface facility 108 may include both of the triggered reminders in the reminders section 502.

Personalized user interface facility 108 may implement and follow any suitable additional or alternative logic for determining how to handle multiple, overlapping reminders for a media program.

Personalized user interface facility 108 may be configured to prioritize reminders for inclusion and/or sorting within the reminders section 502. For example, personalized user interface facility 108 may sort reminders by reminder type. In certain examples, for instance, personalized user interface facility 108 may sort reminders in the following order: "ready for pickup" at kiosk reminders, digital rental expiration reminders, imminent change of availability reminders (e.g., "leaving soon" or "last chance" reminders), "now available" reminders, and "disc out" kiosk reminders.

If personalized user interface facility 108 determines that no reminders for the user have been triggered, personalized user interface facility 108 may present a message, in the reminders section 502, indicating that there are currently no reminders for the user. Alternatively, personalized user interface facility 108 may omit the reminders section 502 from view 500.

The consumption progress section 504 may include personalized user interface content representative of one or more media programs that have been identified as having a consumption progress status with respect to the user. In the example shown in FIG. 5, the consumption progress section 504 includes a grid of cover art images representing media programs that have consumption progress statuses with respect to the user. In addition, for each cover art image, a progress indicator, such as progress bar 512, may be displayed to indicate the current progress of the user in consuming the media program represented by the cover art image.

The media programs represented in the consumption progress section 504 may represent a subset of media programs that have a consumption progress status with respect to the user. Consumption progress section 504 may include a link 514 that is selectable by the user to access a view of all of the media programs that have a consumption progress status with respect to the user.

Personalized user interface facility 108 may be configured to select the subset of the media programs that have a consumption progress status with respect to the user for inclusion in consumption progress section 504 in any suitable way. In certain examples, personalized user interface facility 108 may order the media programs from newest (most recently consumed) to oldest (least recently consumed) and select, from the ordered media programs, a subset of media programs that can be represented within the space of the consumption progress section 504 in view 500 for inclusion in the consumption progress section 504.

In certain examples, personalized user interface facility 108 may limit the consumption progress section 504 of view 500 to include only user interface content that represents media programs currently being consumed by the user, such as media programs that the user has started to consume but not yet finished. In such examples, the consumption progress section 504 may be labeled as a "finish watching" section, as shown in FIG. 5, and personalized user interface facility 108 may be configured to remove a media program from the section when consumption of the media program is completed by the user.

In other examples, personalized user interface facility 108 may consider both partially and completely consumed media programs for representation in the consumption progress section 504. In such examples, personalized user interface facility 108 may prioritize partially consumed media programs over completely consumed media programs, such as by positioning content representing the partially consumed media programs more prominently than the completely consumed media programs in consumption progress section 504.

In certain examples, consumption progress section 504 may include user interface content representing media programs distributed by way of multiple different distribution models. For example, consumption progress section 504 may include user interface content representing media programs distributed by way of multiple distribution models that utilize digital media distribution channel 212, such as subscription distribution model 302-1 and rent/buy distribution model 302-2.

In certain examples, personalized user interface facility 108 may omit media programs distributed to the user by way of certain distribution models from the consumption progress section 504. For example, media programs distribution to the user by way of the kiosk distribution model 302-3 may be omitted from the consumption progress section 504.

If personalized user interface facility 108 determines that no media programs in the personalized user interface domain have a consumption progress status (e.g., an "in-progress consumption status") with respect to the user, personalized user interface facility 108 may present a message, in the consumption progress section 504, indicating that there are currently no media programs that have a current consumption status with respect to the user. Alternatively, personalized user interface facility 108 may omit the consumption progress section 504 from view 500.

The bookmarks section 506 may include personalized user interface content representative of one or more media programs that are bookmarked by or for the user. In the example shown in FIG. 5, the bookmarks section 506 includes a list of user-selectable media program titles representing media programs that are currently bookmarked with respect to the user. In addition to a title, the top entry in the list includes a cover art image 516, a link 518 to more information about the media program, and an option 520 to remove the bookmark from the media program. If the user selects option 520, the bookmark is removed from the media program, and the bookmarks section 506 is updated by removing the user interface content representing the media program and moving other bookmarked media programs up in the list.

The media programs represented in the bookmarks section 506 may be a subset of the media programs currently bookmarked with respect to the user. Personalized user interface facility 108 may be configured to select the subset of the bookmarked media programs for inclusion in bookmarks section 506 in any suitable way. In certain examples, personalized user interface facility 108 may order the bookmarked media programs from newest (most recently bookmarked) to oldest (least recently bookmarked) and select a first number of media programs that can be represented within the space of the bookmarks section 506 in view 500 for inclusion in the bookmarks section 506. The bookmarks section 506 may include a link 522 that is selectable by the user to access a bookmarks view of all of the media programs that have a bookmarked status with respect to the user.

In certain examples, bookmarks section 506 may include content representing media programs distributed by way of multiple different distribution models. For example, bookmarks section 506 may include content representing media programs distributed by way of a combination or sub-combination of subscription digital distribution model 302-1, rent/buy digital distribution model 302-2, and kiosk distribution model 302-3.

If personalized user interface facility 108 determines that no media programs in the personalized user interface domain have a bookmark status with respect to the user, personalized user interface facility 108 may present a message, in the bookmarks section 506, indicating that there are currently no media programs that have a bookmark status with respect to the user. Alternatively, personalized user interface facility 108 may omit the bookmarks section 506 from view 500.

Purchases section 508 may include user interface content representative of one or more media programs that have been identified as having a purchase status with respect to the user (e.g., media programs that have been purchased by the user through the media service 102). In the example shown in FIG. 5, the purchases section 508 includes a grid of cover art images representing media programs that have purchase statuses with respect to the user.

The media programs represented in the purchases section 508 may represent a subset of media programs that have a purchase status with respect to the user. Purchases section 508 may include a link 524 that is selectable by the user to access a view of all of the media programs that have a purchase status with respect to the user.

Personalized user interface facility 108 may be configured to select the subset of the media programs that have a purchase status with respect to the user for inclusion in purchases section 508 in any suitable way. In certain examples, personalized user interface facility 108 may order the media programs from newest (most recently purchased) to oldest (least recently purchased) and select a first number of ordered media programs that can be represented within the space of the purchases section 508 in view 500 for inclusion in the purchases section 508.

In certain examples, purchases section 508 may include user interface content representing media programs distributed by way of multiple different distribution models. For example, purchases section 508 may include user interface content representing media programs distributed by way of multiple transactional-based models, including such models that allow purchase of and access to a digital copy of the media program by way of digital media distribution channel 212 and a physical copy of the media program by way of physical media distribution channel 220. For instance, purchases section 508 may include user interface content representing media programs purchased by the user by way of rent/buy distribution model 302-2 and kiosk distribution model 302-3.

If personalized user interface facility 108 determines that no media programs in the personalized user interface domain have a purchase status with respect to the user, personalized user interface facility 108 may present a message, in the purchases section 508, indicating that there are currently no media programs that have a purchase status with respect to the user. Alternatively, personalized user interface facility 108 may omit the purchases section 508 from view 500.

View 500 may include one or more links to one or more other views of a personalized user interface. For example, in FIG. 5, view 500 includes a link 526 to a drop-down menu of user-selectable view options mapped to a set of views of the personalized user interface. In response to a user selection of link 526, the drop-down menu of options may be displayed in view 500. In certain examples, the menu of view options may include a first option mapped to a personalized dashboard view such as view 500, a second option mapped to a personalized watch history view such as view 600 shown in FIG. 6, a third option mapped to a personalized bookmarks view such as view 700 shown in FIG. 7, and a fourth option mapped to a personalized purchases view such as view 800 shown in FIG. 8. The link 526 to the drop-down menu of view options may be persistent across the views shown in FIGS. 5-8.

Figure 6:
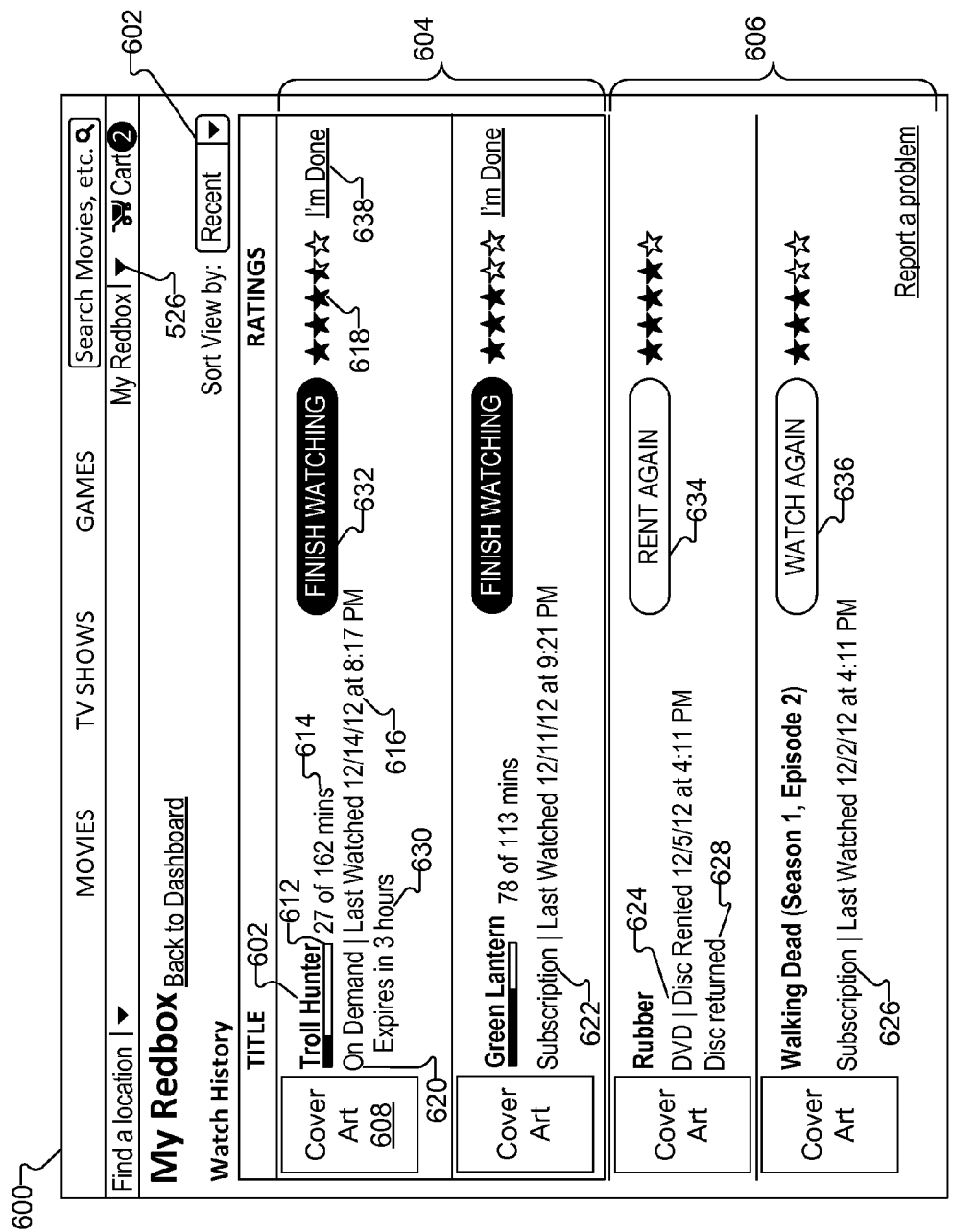

FIG. 6 illustrates an exemplary personalized user interface view 600 ("view 600") that may be provided by personalized user interface facility 108. In certain examples, view 600 may be a personalized watch history view that includes personalized user interface content indicative of consumption progress statuses of media programs with respect to a user.

As shown, view 600 may include a list of entries representing media programs that have consumption progress statuses with respect to the user. The list of entries may be sorted in any suitable way. For example, the list may be sorted from the most recently consumed media program to the least recently consumed media program (e.g., from the most recent user consumption interaction to least recent user consumption interaction). View 600 may include a sort tool 602 for use by the user to change the way that the list is sorted. The list may be scrollable to allow all media programs having consumption progress statuses with respect to the user to be represented in the list.

In certain examples, the list of entries may include entries representing both partially consumed and completely consumed media programs. In the illustrated example, the list includes separate sections, such as a partially consumed section 604 in which media programs that are partially consumed by the user are represented, and a completely consumed section 606 in which media programs that have been completely consumed by the user are represented. In this or a similar manner, partially consumed media programs may be prioritized over completely consumed media programs within view 600.

Each entry in the list may include user interface content representing a media program and the consumption progress status of the media program with respect to the user. For example, each entry may include a title and cover art image for the respective media program. In the illustrated example, the first entry in the list includes a cover art image 608 of title 610 of the media program.

In addition, each entry in the list may include user interface content indicating the consumption progress status of the media program with respect to the user. For example, an entry may indicate that a media program has been completely consumed by the user (e.g., as indicated in the third and fourth entries in the list), or that a media program has been partially consumed by the user (e.g., as indicated in the first and second entries in the list). For a partially consumed media program, an entry may include content indicating the degree to which the media program has been consumed. For example, the first entry in the list includes a progress bar 612 and text 614 indicating how much of the media program has been consumed by the user.

In addition, each entry in the list may include user interface content indicating a time of the most recent consumption interaction by the user with the media program. In the first entry, for example, content 616 indicates a date and time that the media program was last watched by the user.

Each entry may also include rating information for the media program. The rating information may indicate a rating of the media program by the user or a community of users of the media service 102. For example, the first entry in the list includes rating information 618. In some examples, the rating information in an entry may indicate whether the user has rated or not rated the media program and may be selectable by the user to access a user interface tool for providing a rating of the media program.

The media programs represented in view 600 may be associated with multiple different media distribution models. For example, the media programs may have been accessed by the user by way of different distribution models. View 600 may include user interface content indicating the distribution models by way of which the user accessed the media programs. In the illustrated example, the first entry includes content 620 indicating that the corresponding media program was accessed by the user by way of an "on demand" media distribution model, the second entry includes content 622 indicating that the corresponding media program was accessed by the user by way of a "subscription" media distribution model, the third entry includes content 624 indicating that the corresponding media program was accessed by the user by way of physical media distribution model (e.g. a DVD disc rental distribution model), and the second entry includes content 626 indicating that the corresponding media program was accessed by the user by way of a "subscription" media distribution model.

View 600 may include content indicating additional or alternatively information about the media programs that have consumption progress statuses with respect to the user. For example, the third entry in the list includes content 628 indicating that a physical copy of the corresponding media program has been returned to a media vending kiosk. As another example, the first entry in the list includes content 630 indicating that a digital rental of the corresponding media program expires in three hours.

View 600 may include contextual options for selection by the user to further interact with the media programs represented in view 600. For example, for a partially consumed media program, view 600 may include an option for selection by the user to finish consuming the media beginning at the point in the media program that partial consumption ended. To illustrate, the first entry in the list includes a finish watching option 632 for selection by the user.

As another example, for a completely consumed media program, view 600 may include an option for selection by the user to initiate a new consumption of the media program. For example, the third entry in the list includes an option 634 for selection by the user to initiate another rental of a physical copy of the corresponding media program, and the fourth entry in the list includes an option 636 for selection by the user to start watching the corresponding media program again from the beginning of the media program.

Additionally or alternatively, for a partially consumed media program, view 600 may include an option for selection by the user to indicate that the user is finished consuming the media program and does not want to consume the media program to completion. For example, the first list in the entry includes an option 638 for selection by the user to indicate that the user is finished watching the corresponding media program. In response to a user selection of option 638, the first entry in the list may be removed from the list or moved to a different position in the list. For instance, the first entry in the list may be moved from the partially consumed section 604 to the completely consumed section 606 in response to a user selection of option 638. Content of the first entry may be modified when the first entry is moved from the partially consumed section 604 to the completely consumed section 606. For example, the progress bar 612 and text 614 indicating how much of the media program has been consumed by the user may be removed from the first entry.

FIG. 7 illustrates an exemplary personalized user interface view 700 ("view 700") that may be provided by personalized user interface facility 108. In certain examples, view 700 may be a personalized bookmarks view that includes personalized user interface content indicative of bookmark statuses of media programs with respect to a user. View 700 may be used by the user to manage media programs that have been bookmarked by the user.

As shown, view 700 may include a list of entries representing media programs that have bookmarked statuses with respect to the user. The list of entries may be sorted in any suitable way. For example, the list may be sorted from the most recently bookmarked media program to the least recently bookmarked media program (e.g., from the most recent user bookmark interaction to least recent user bookmark interaction). As another example, the list may be sorted alphabetically by titles of the media programs. View 700 may include a sort tool 702 for use by the user to change the way that the list is sorted. The list may be scrollable to allow all media programs having bookmarked statuses with respect to the user to be represented in the list.

The list of entries may represent any media programs that have been bookmarked by the user, including media programs having different access statuses, consumption progress statuses, and/or availability statuses, as well as media programs available for access by way of different media distribution models. View 700 may include content indicating any of this information about the media programs.

View 700 may include user interface content indicating information about bookmark interactions by the user. For example, the second entry in the list includes content 704 indicating a date that the corresponding media program was bookmarked by the user.

View 700 may include options for selection by the user to remove bookmarked statuses from bookmarked media programs. For example, the first entry in the list includes an option 706 for selection by the user to un-bookmark the corresponding media program. In response to a user selection of option 706, a bookmark may be removed from the media program and the entry for the media program removed from the list of entries in view 700.

FIG. 8 illustrates an exemplary personalized user interface view 800 ("view 800") that may be provided by personalized user interface facility 108. In certain examples, view 600 may be a personalized purchases view that includes personalized user interface content indicative of purchase statuses of media programs with respect to a user. View 800 may be used by the user to discover, consume, and/or manage media programs that have been purchased by the user.

As shown, view 800 may include a list of entries representing media programs that have purchased statuses with respect to the user. The list of entries may be sorted in any suitable way. For example, the list may be sorted from the most recently purchased media program to the least recently purchased media program (e.g., from the most recent user purchase interaction to least recent user purchase interaction). As another example, the list may be sorted alphabetically by titles of the media programs. View 800 may include a sort tool 802 for use by the user to change the way that the list is sorted. The list may be scrollable to allow all media programs having purchased statuses with respect to the user to be represented in the list.

The list of entries may represent any media programs that have been purchased by the user, including media programs having different access statuses, consumption progress statuses, and/or availability statuses, as well as media programs available for access by way of different media distribution models. View 800 may include content indicating any of this information about the media programs, such as content indicating consumption progress statuses, media formats, and distribution models of media programs.

View 800 may include user interface content indicating information about purchase interactions by the user. For example, the second entry in the list includes content 804 indicating a date and time that the corresponding media program was purchased by the user.

View 800 may include contextual options for selection by the user to further interact with the purchased media programs. The options may be contextually selected based on one or more statuses of the media programs, such as the consumption progress statuses of the media programs. For example, the first entry includes an option 806 for selection by the user to initiate a first-time playback of the corresponding media program from the beginning of the media program, the second entry includes an option 808 for selection by the user to continue consumption of the corresponding media program from the point that consumption stopped, and the fourth entry includes an option 810 for selection by the user to initiate another playback of the corresponding media program from the beginning of the media program.

Figure 9:
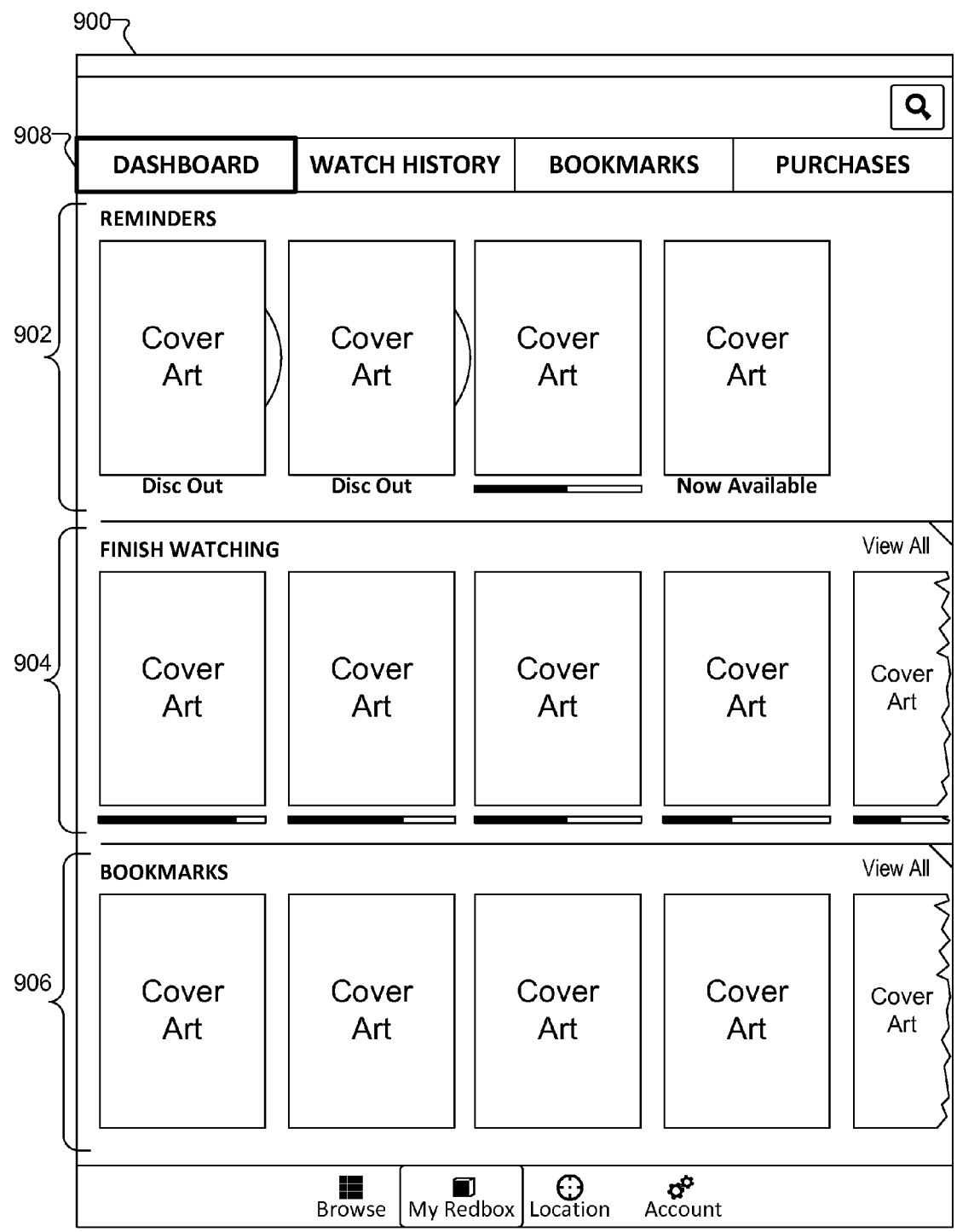
Figure 10:
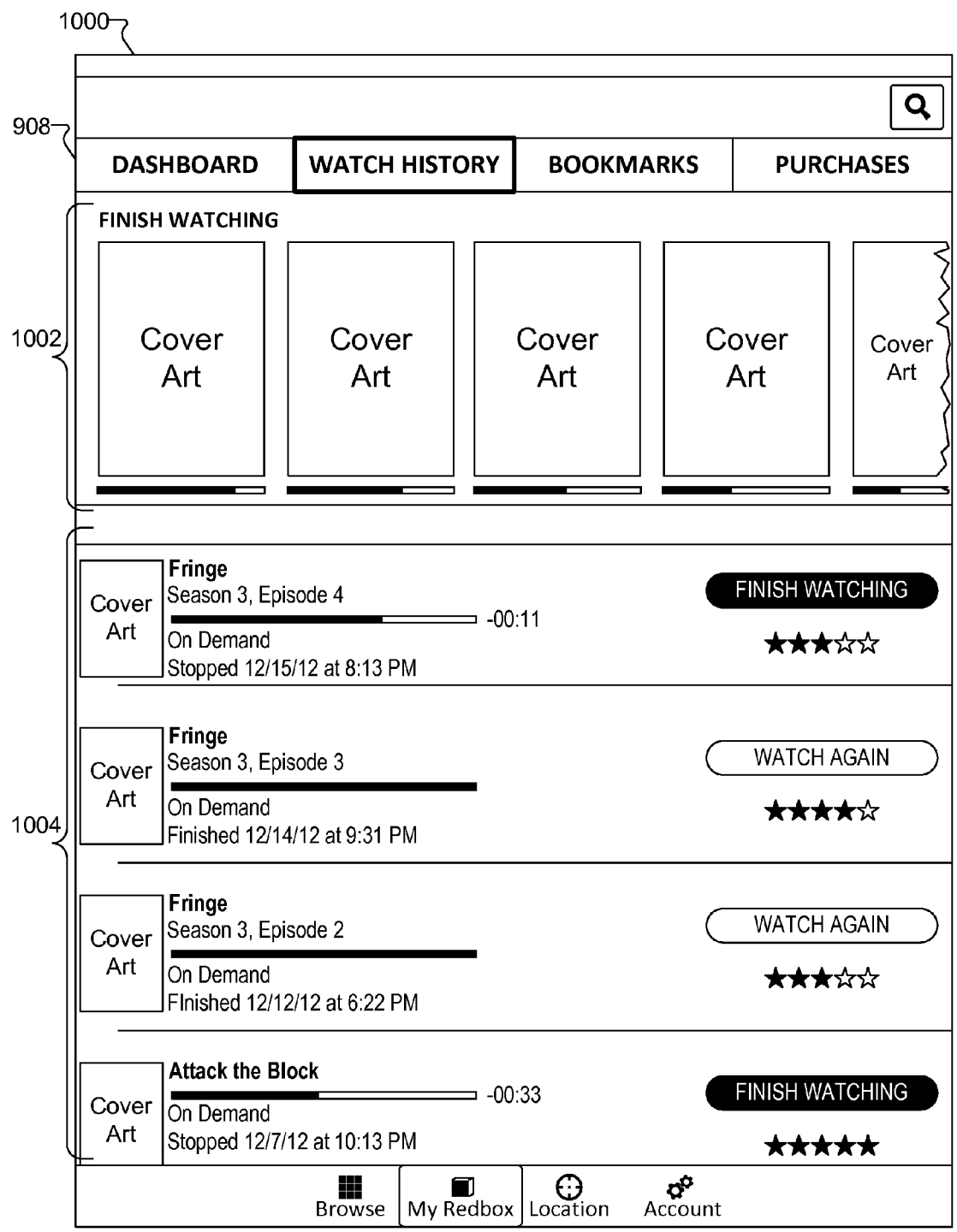

The exemplary personalized user interface views shown in FIGS. 5-8 are illustrative only. Personalized user interface facility 108 may generate and provide other exemplary views of a personalized user interface in other examples. FIGS. 9-10 illustrate examples of other views of a personalized user interface.

FIG. 9 illustrates an exemplary personalized user interface view 900 ("view 900") that may be provided by personalized user interface facility 108. View 900 is another example of a launch page and/or personalized dashboard view of a personalized media service user interface. As shown, view 900 may include a reminders section 902, a finish watching section 904, and a bookmarks section 906, the contents of which may be similar to the contents of view 500 described above.

View 900 may also include a header menu bar 908 that includes view options mapped to views of the personalized user interface. Specifically, menu bar 908 includes options mapped to a personalized dashboard view, a personalized watch history view, a personalized bookmarks view, and a personalized purchases view.

FIG. 10 illustrates an exemplary personalized user interface view 1000 ("view 1000") that may be provided by personalized user interface facility 108. View 1000 is another example of a personalized watch history view of a personalized media service user interface. As shown, view 1000 may prioritize partially consumed media programs over other media programs. For example, view 1000 may include a finish watching section 1002 dedicated to represented only media programs that have been partially consumed by the user and a leftover section 1004 that may represent remaining media programs, including partially and completely consumed media programs. The contents of view 1000 may be similar to the contents of view 600 described above The header bar 908 shown in FIG. 9 may be persistent across view 900 and view 1000. In view 1000, a watch history option in the menu bar 908 is selected.

In certain examples, personalized user interface facility 108 may be configured to prioritize placement of sections of content within a user interface view based on one or more prioritization factors, such as based on time sensitivity of content of the sections and/or a predicted level of importance of the content of the sections to a user (e.g., based on what a user should consume next to be most productive and/or to not miss due to time sensitive access to media programs). For example, the placement of sections of a personalized dashboard view may be prioritized within the dashboard view.

As an example, the locations of the reminders section 502, consumption progress section 504, bookmarks section 506, and purchases section 508 in dashboard view 500 may be selected by personalized user interface facility 108 based on prioritization of the sections. For instance, the reminders section 502 may be positioned as the top-most and highest priority section based on the time sensitive nature of the reminders about media programs included in the section 502. The consumption progress section 504 may be positioned based on a next level of priority, such as based on helping the user to be productive by finishing consumption of media programs that have been partially consumed. The bookmarks section 506 may be positioned based on a next level of priority, such as based on the bookmarked media programs being the next likely media programs that the user would like to consume. The purchases section 508 may be positioned at the bottom of the dashboard view 500 based on a lack of time sensitivity of access to the media programs in the section 508 (e.g., they have been purchased by the user, so they remain accessible to the user).

As another example, the reminders section 902, finish watching section 904, and bookmarks section 906 may be priority-placed within dashboard view 900 based on one or more of the same or similar prioritization factors.

In certain examples, personalized user interface facility 108 may be configured to initiate execution of a specific operation in response to a context of a user selection of a media program within any of the exemplary user interface views described herein, such as based on a specific user interface view or section of the view from which the media program is selected by the user. For example, when dashboard view 500 is displayed, personalized user interface facility 108 may be configured to launch playback of a media program in response to a user selection of the media program from within the reminders section 502 when the user has been granted access to the media program through a subscription to the media service 102 or by renting the media program through a rental transaction. Additionally or alternatively, when dashboard view 500 is displayed, personalized user interface facility 108 may be configured to launch playback of a media program in response to a user selection of the media program from within the consumption progress section 504 when the user has started but not completed consumption of the media program. Additionally or alternatively, personalized user interface facility 108 may be configured to launch an information view for a media program (e.g., a view dedicated to the information and/or options related to the media program) in response to a user selection of the media program from the bookmarks section 506 or the purchases section 508.

Figure 11:
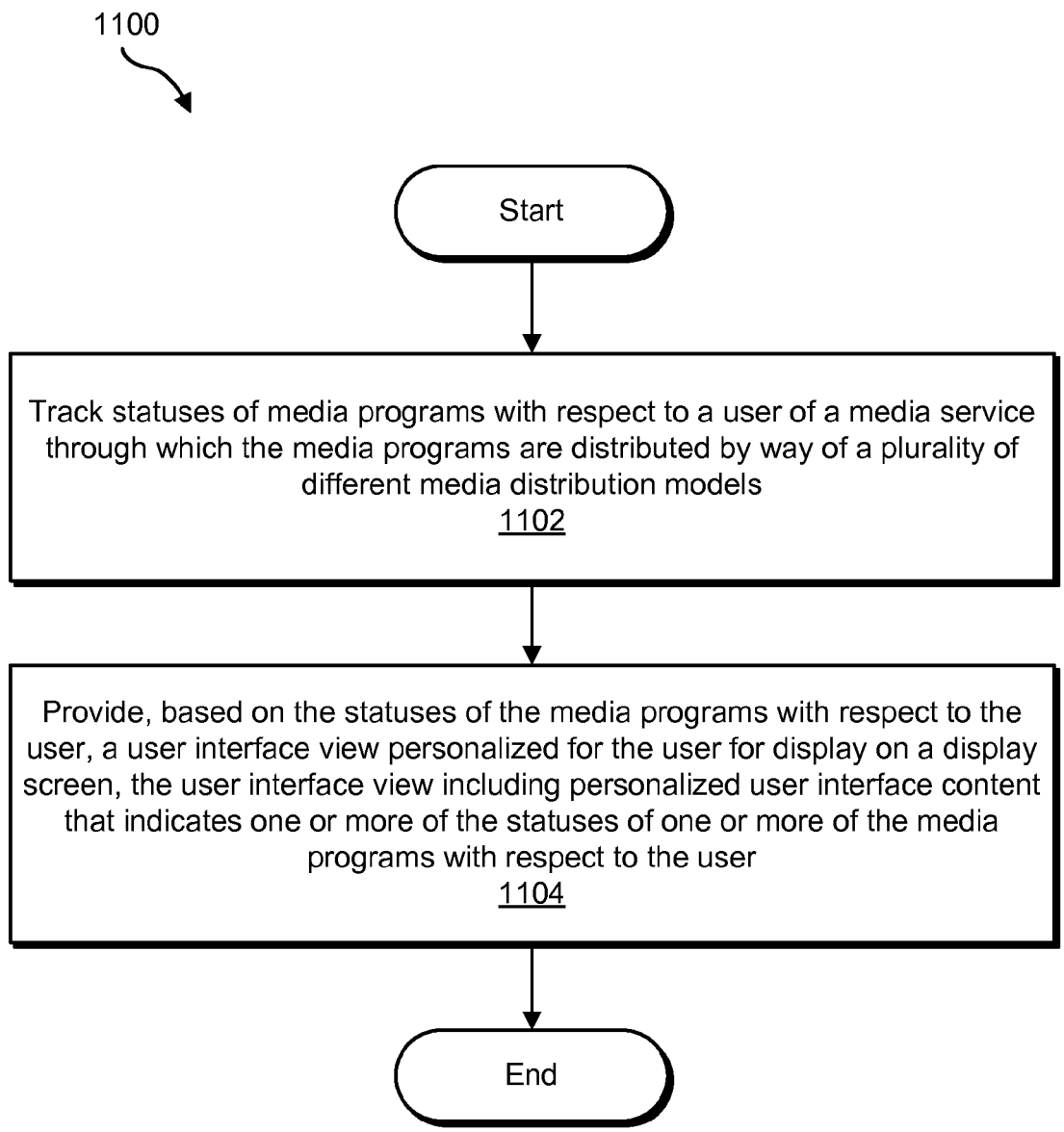
FIG. 11 illustrates an exemplary method of providing a personalized media service user interface according to principles described herein.

FIG. 11 illustrates an exemplary method of providing a personalized media service user interface according to principles described herein. While FIG. 11 illustrates exemplary steps according to certain embodiments, other embodiments may omit, add to, reorder, combine, and/or modify any of the steps shown in FIG. 11. In certain embodiments, one or more of the steps shown in FIG. 11 may be performed by system 100 and/or one or more components or implementations of system 100.

In step 1102, a system (e.g., system 100) tracks statuses of media programs with respect to a user of a media service (e.g., media service 102) through which the media programs are distributed by way of a plurality of different media distribution models. Step 1102 may be performed in any of the ways described herein, and may include tracking any number of statuses of any number of media programs.

In step 1104, the system provides, based on the statuses of the media programs with respect to the user, a user interface view personalized for the user for display on a display screen. Step 1104 may be performed in any of the ways described herein. The user interface view may include personalized user interface content that indicates one or more of the statuses of one or more of the media programs with respect to the user. The user interface view may indicate any number of statuses for any number of media programs. The user interface view may be any of the exemplary personalized user interface views described herein or any other personalized user interface view that includes personalized user interface content according to principles described herein.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 12:
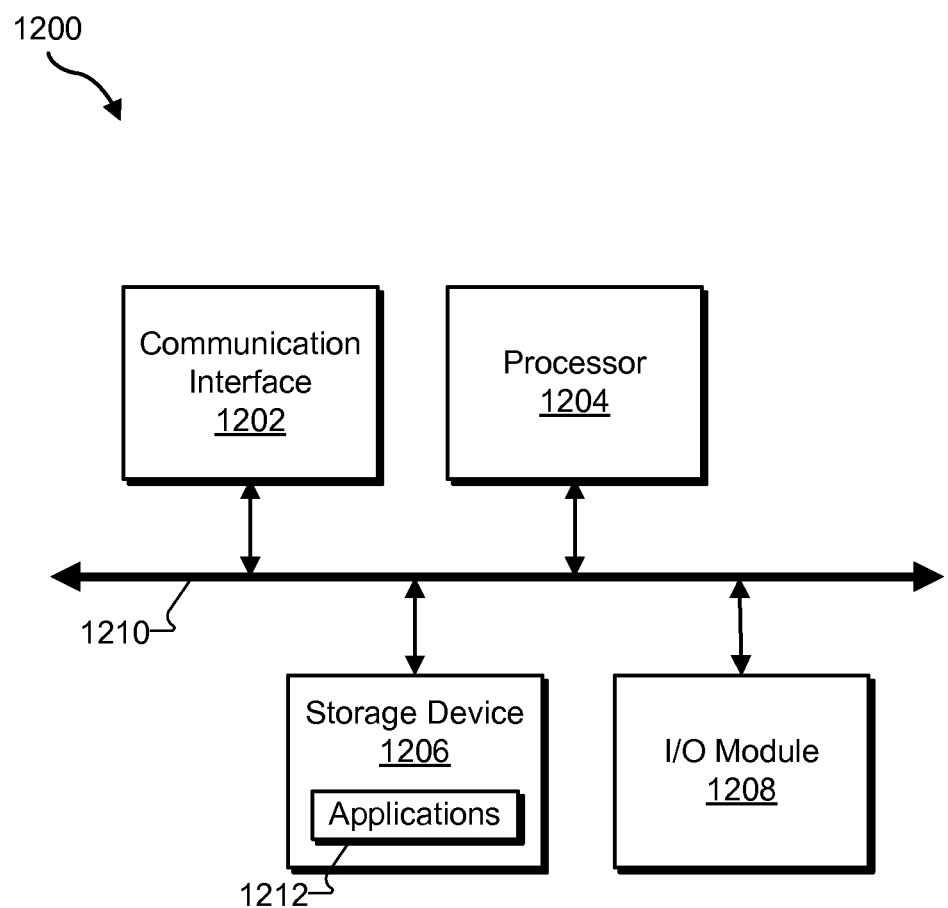
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1202 may be configured to interface with any suitable communication media, protocols, and formats.

Processor 1204 generally represents any type or form of physical computer processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another non-transitory computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1200. For example, one or more applications 1212 residing within storage device 1206 may be configured to direct processor 1204 to perform one or more processes or functions associated with one or more of the systems and/or facilities described herein. Likewise, any of the storage facilities described herein may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
 tracking, by a media service provider system, statuses of media programs with respect to a user of a media service, the statuses including
  a first status, with respect to the user, of a first media program included in the media programs and distributed by way of a digital media distribution model, and
  a second status, with respect to the user, of a second media program included in the media programs and distributed by way of a physical media distribution model; and
 providing, by the media service provider system for display on a display screen, a user interface view associated with the media service and personalized for the user, the user interface view including personalized user interface content indicating the first status of the first media program and the second status of the second media program with respect to the user;

wherein the media service is an integrated media service that distributes media programs by way of the digital media distribution model and by way of the physical media distribution model.

2. The method of claim 1, wherein the digital media distribution model utilizes a digital media distribution channel; and the physical media distribution model utilizes a physical media distribution channel.

3. The method of claim 1, wherein the digital media distribution model comprises at least one of a subscription-based media distribution model and a transactional-based media distribution model.

4. The method of claim 1, wherein user interface content indicates that the first media program is distributed by way of the digital media distribution model and that the second media program is distributed by way of the physical media distribution model.

5. The method of claim 1, wherein:

the first status comprises a first consumption progress status of the first media program with respect to the user; and the second status comprises a second consumption progress status of the second media program with respect to the user.

6. The method of claim 1, wherein:

the first status comprises one of an access status, a bookmark status, and a consumption progress status for the first media program; and the second status comprises a different one of the access status, the bookmark status, and the consumption progress status for the second media program.

7. The method of claim 1, wherein the user interface view comprises a personalized dashboard view that includes at least one of a consumption progress status area, a bookmark status area, and a purchase status area.

8. The method of claim 7, wherein the user interface view further comprises a reminders section that includes one or more reminders of one or more of the statuses of one or more of the media programs.

9. The method of claim 1, wherein the user interface view includes a reminder indicating a change in an availability status of a media program included in the media programs.

10. The method of claim 8, wherein the change in the availability status comprises one of a recent change and an imminent change in the availability status of the media program.

11. The method of claim 1, wherein:

the first status indicates a partial consumption of the first media program;

the second status indicates a complete consumption of the second media program; and the first media program having the first status that indicates the partial consumption is prioritized, in the user interface view, over the second media program having the second status that indicates the complete consumption.

12. The method of claim 1, wherein the user interface view further includes a menu of view options, the view options comprising at least two of:

a first view option mapped to a personalized dashboard view;

a second view option mapped to a personalized watch history view;

a third view option mapped to a personalized bookmarks view; and a fourth view option mapped to a personalized purchases view.

13. The method of claim 1, wherein:

the tracking of the statuses of the media programs with respect to the user comprises detecting direct interactions by the user with the media programs, and defining a personalized user interface domain, based on the detected direct interactions, to include data representative of the media programs; and the providing of the user interface view comprises selecting, from the media programs included in the personalized user interface domain and based the statuses of the media programs with respect to the user, one or more of the media programs for inclusion in the user interface view.

14. The method of claim 13, wherein the providing of the user interface view further comprises selecting, from the media programs included in the personalized user interface domain and based on availability statuses of the media programs, one or more additional media programs for inclusion in the user interface view.

15. The method of claim 1, embodied as computer-executable instructions on at least one non-transitory computer-readable medium.

16. A method comprising:

tracking, by a media service provider system, a plurality of statuses of a plurality of media programs with respect to a user of a media service, the plurality of statuses including a first status, with respect to the user, of a first media program included in the plurality of media programs and distributed by way of a first digital media distribution model, a second status, with respect to the user, of a second media program included in the plurality of media programs and distributed by way of a second digital media distribution model, and a third status, with respect to the user, of a third media program included in the plurality of media programs and distributed by way of a physical media distribution model; and providing, by the media service provider system for display on a display screen, a user interface view associated with the media service and personalized for the user, the user interface view including personalized user interface content indicating the first status of the first media program, the second status of the second media program, and the third status of the third media program with respect to the user;

wherein the media service is an integrated media service that distributes media programs by way of the first and second media distribution models and by way of the physical media distribution model.

17. The method of claim 16, wherein:

the first digital media distribution model comprises a subscription digital media distribution model that utilizes a digital media distribution channel;

the second digital media distribution model comprises a transactional digital media distribution model that utilizes the digital media distribution channel; and the physical media distribution model utilizes a physical media distribution channel.

18. The method of claim 16, embodied as computer-executable instructions on at least one non-transitory computer-readable medium.

19. A system comprising:
- at least one processor; and
- a personalized user interface facility that directs the at least one processor to
  - track statuses of media programs with respect to a user of a media service, the statuses including
    - a first status, with respect to the user, of a first media program included in the media programs and distributed by way of a digital media distribution model, and
    - a second status, with respect to the user, of a second media program included in the media programs and distributed by way of a physical media distribution model; and
  - provide, for display on a display screen, a user interface view associated with the media service and personalized for the user, the user interface view including personalized user interface content indicating the first status of the first media program and the second status of the second media program with respect to the user;
- wherein the media service is an integrated media service that distributes media programs by way of the digital media distribution model and by way of the physical media distribution model.

20. The system of claim 19, wherein the digital media distribution model comprises at least one of a subscription-based media distribution model and a transactional-based media distribution model.

* * * * *